Patented Aug. 7, 1945

2,381,267

UNITED STATES PATENT OFFICE 2,381,267

ABRASIVE ARTICLES

Charles E. Drake, Bloomfield, N. J., assignor to United States Rubber Company, New York, N. Y., a corporation of New Jersey No Drawing. Application June 24, 1943,
Serial No. 492,124

12 Claims. (Cl. 51—299)

The present invention relates to the manufacture of abrasive articles and more particularly to flexible and resilient hard-rubber type grinding wheels.

Abrasive articles in which abrasive grains are bonded by an irreversible or non-thermoplastic bond, for example, hard vulcanized rubber, or synthetic resin of the phenol-formaldehyde or similar type, are well known. In the hard rubber bond, the rubber is mixed with about one-half its weight of sulphur, the abrasive grains mixed in, and the material vulcanized to a hard non-resilient grinding wheel or other kind of abrasive article.

According to the present invention, an abrasive article is produced that has a hard-rubber type bond, that is, a bond that resembles a bond of hard vulcanized natural rubber, but is one which has appreciable flexibility and resilience.

In carrying out the present invention, the abrasive grains are bonded with a vulcanized composition containing two synthetic rubber-like materials, one which will cure irreversibly to a state comparable to hard rubber or so-called ebonite, and another which will cure irreversibly to a state resembling soft vulcanized rubber but which will not cure to a hard state comparable to that of hard rubber. Examples of the first type of synthetic rubber-like materials are the copolymers of a major proportion of butadiene-1,3 and a minor proportion of a compound which contains a

group and is copolymerizable therewith, for example, styrene, alkyl styrene, acrylic nitrile, alkylacrylic nitrile. Examples of the second type of synthetic rubber-like materials are polymerized chloro-2-butadiene-1,3; copolymers of a major proportion of isobutylene and a minor proportion of conjugated diolefine copolymerizable therewith, for example, butadiene-1,3, 2 methyl butadiene-1,3 (isoprene), 2,3 dimethyl butadiene-1,3, and pentadiene-1,3; and certain of the so-called organic polysulphide polymer plastics. These synthetic rubber-like materials are obtainable commercially in an intermediate or partially polymerized and plastic state resembling unvulcanized rubber, and may be cured in a known manner in the first type to a hard state comparable to hard rubber, and in the second type to an elastic state resembling soft vulcanized rubber, but not to a hard state comparable to hard rubber. When abrasive grains are incorporated in a blend of these two types of partially polymerized materials with the necessary vulcanizing ingredients and the mass cured or vulcanized, a resilient and flexible hard-rubber type bond for the abrasive grains is formed.

Copolymers of a major proportion of butadiene-1,3 and a minor proportion of styrene are known under the trade name Buna S, and their manufacture is described in the Tschunkur and Bock Patent 1,938,730. Copolymers of a major proportion of butadiene-1,3 and a minor proportion of acrylic nitrile are known commercially as Buna N, Perbunan, Hycar, and Chemigum, and are described in the Konrad and Tschunkur Patent 1,973,000. These copolymers of butadiene and styrene or acrylic nitrile may be vulcanized to a hard rubber state by heating with 25 to 45 or more parts of sulphur per 100 parts of the copolymer, and other vulcanizing ingredients if desired, similarly to the preparation of hard rubber. Polymerized chloro-2-butadiene-1,3 is a commercial material known as neoprene, and is described in the Carothers and Collins Patent 1,950,432. The material will cure on heating, with or without the addition of a so-called curing agent, such as magnesium oxide. Copolymers of a major proportion of isobutylene and a minor proportion of a conjugated diolefine are known under the trade name Butyl Rubber, and are described in British Patent 523,248, and in Ind. and Eng. Chem., vol. 32, pp. 1283–1292. Butyl Rubber may be cured or vulcanized by heating with small amounts of sulphur and the conventional vulcanizing ingredients used with natural rubber, such as zinc oxide and organic accelerators. U. S. patent to Patrick 1,890,191 describes the reaction between alkali polysulphides and olefine compounds, particularly the dihalides, to produce the now well known olefine polysulphide plastics. Such olefine polysulphide plastics are substantially polymers of the structural unit

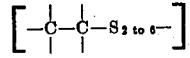

where the carbon atoms are adjacent. U. S. patent to Patrick 2,216,044 describes similar plastic polymers where the space between the adjacent carbon atoms in the above referred structural unit is opened up and an intervening structure is employed such as an ether linkage, unsaturated carbon atoms, aromatic structure, saturated straight chain hydrocarbons, or saturated branched chain hydrocarbons, giving polymers of the structural unit

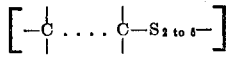

where

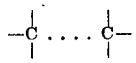

represents two carbon atoms separated by and joined to such an intervening structure. The above polymers of the structural units

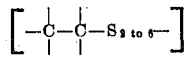

and

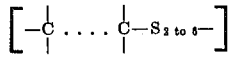

will be termed herein as "organic polysulphide polymer plastics." They are known commercially under the trade name Thiokols. The polymers of substantially the structural units

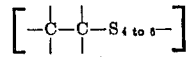

and the polymers of substantially the structural unit

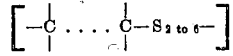

may be cured or vulcanized in a known manner, generally by heating in the presence of 10 to 20 parts of zinc oxide per hundred parts of the Thiokol, to a state resembling soft vulcanized rubber but will not cure to a state comparable to hard rubber. Buna S, Buna N, neoprene, Butyl Rubber, and Thiokol are well known types of synthetic rubber.

The term "rubber" as used herein, as in reference to soft vulcanized rubber and hard rubber, means natural rubber. It is well known that there are vast differences in the physical properties of soft vulcanized rubber, which contains up to 10 parts of combined sulphur per 100 parts of rubber, and hard rubber, which contains 30 to 47 parts of combined sulphur per 100 parts of rubber. The terms "soft vulcanized rubber" and "hard rubber" are well understood in the art and the properties that distinguish one from the other are so well known that no further definition or distinction need be made than by use of these terms. As illustrative of the great difference in properties of the two materials, the modulus of rigidity of soft vulcanized rubber is of the order of 20 to 100 lbs. per sq. in., while the modulus of rigidity of hard rubber or ebonite is of the order of 100,000 to 200,000 lbs. per sq. in. The elongation at break of soft vulcanized rubber is several hundred percent while the elongation at break of hard rubber is generally less than fifteen percent. Copolymers of a major proportion of butadiene-1,3 and a minor proportion of a monovinyl compound such as styrene or acrylic nitrile will cure on heating with twenty to forty or more parts of sulphur per one hundred parts of the copolymer to a condition or state where its physical properties are comparable to those of hard rubber as described above. On the other hand, polymerized chloro-2-butadiene-1,3, copolymers of a major proportion of isobutylene and a minor proportion of a diolefine, and the organic polysulphide polymer plastics specified above, will vulcanize only to a state or condition where its physical properties resemble those of soft rubber as described above, but will not cure or vulcanize to a state where its properties are comparable to those of hard rubber.

The preferred proportions of the two types of synthetic rubber-like material in the bond composition are within the range 1:5 to 5:1 parts by weight. With such proportions, bonded abrasive articles with widely varying grinding qualities, flexibility and hardness may be made.

The synthetic rubber-like materials may be mixed on a conventional rubber mill together with curing and compounding ingredients. The resulting blend may then be mill-mixed with a given quantity of abrasive grains, such as aluminum oxide, silicon carbide, or any of the regularly known abrasives. The resulting mass may be formed into the desired shape of the article and cure. In making grinding wheels, the mix may be sheeted out to the prescribed thickness, and before or after cutting or dieing to shape, heat-cured, as in a press, similarly to hard rubber, for example at 50 pounds steam pressure for upwards of three hours.

Examples of typical formulae for the bond composition are as follows, the amounts of ingredients indicated being parts by weight:

| Bond | I | II | III | IV | V | VI | VII |
|---|---|---|---|---|---|---|---|
| Buna S | 100 | 100 | | 100 | | 100 | |
| Buna N | | | 100 | | 100 | | 100 |
| Sulphur | 50 | 50 | 50 | 50 | 50 | 50 | 50 |
| Neoprene | 60 | 300 | 180 | | | | |
| Magnesium oxide | 10 | 50 | 30 | | | | |
| Thiokol | | | | 100 | 100 | | |
| Zinc oxide | | | | 20 | 20 | 10 | 10 |
| Butyl rubber | | | | | | 100 | 100 | together with such amounts of antioxidants, accelerators, etc., as are desired. For example, four parts of diphenyl guanidine may be added to each of the above formulae as an accelerator. The Thiokol in formulae IV and V above was a commercial organic polysulphide polymer plastic which could be cured to a state resembling soft vulcanized rubber but not to a state comparable to hard rubber. Twenty parts by weight of each of the above bond compounds were mixed with eighty parts by weight of abrasive grains, and the masses sheeted and formed into grinding wheels which were press-cured. The cured compositions of the present invention are not limited to bonding abrasives. The mixtures of the two types of synthetic rubber-like materials with the vulcanizing ingredients may be sheeted or molded, and cured or vulcanized with or without contact or attachment to some other material, such as fabric or metal, to give hard-rubber type vulcanizates where additional flexibility and resilience is desired.

This application is a continuation-in-part of my application Serial No. 476,947, filed February 24, 1943.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. An abrasive article comprising abrasive grains and a bond containing the vulcanization product of a mixture of a copolymer of a major proportion of butadiene and a minor proportion of a compound which contains a

group and is copolymerizable therewith, sulphur in amount to vulcanize said copolymer to a state comparable to hard rubber, and a material selected from the group consisting of polymerized chloro-2-butadiene-1,3, copolymers of a major proportion of isobutylene and a minor proportion of a conjugated diolefine copolymerizable therewith, organic polysulphide polymer plastics which are polymers of substantially the structural unit

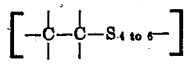

and organic polysulphide polymer plastics which are polymers of substantially the structural unit

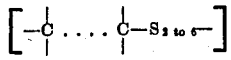

where

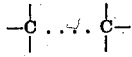

represents two carbon atoms joined to and separated by intervening structure.

2. An abrasive article comprising abrasive grains and a bond containing the vulcanization product of a mixture of a synthetic rubber copolymer of a major proportion of butadiene and a minor proportion of a compound which contains a

group and is copolymerizable therewith, sulphur in amount to vulcanize said copolymer to a state comparable to hard rubber, and a synthetic rubber selected from the group consisting of polymerized chloro-2-butadiene-1,3, copolymers of a major proportion of isobutylene and a minor proportion of a conjugated diolefine copolymerizable therewith, organic polysulphide polymer plastics which are polymers of substantially the structural unit

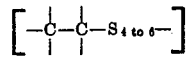

and organic polysulphide polymer plastics which are polymers of substantially the structural unit

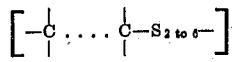

where

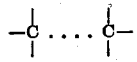

represents two carbon atoms joined to and separated by intervening structure, the proportions of the two synthetic rubbers being within the range 1:5 to 5:1 parts by weight.

3. An abrasive article comprising abrasive grains and a bond containing the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and polymerized chloro-2-butadiene-1,3.

4. An abrasive article comprising abrasive grains and a bond containing the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and a copolymer of a major proportion of isobutylene and a minor proportion of a conjugated diolefine copolymerizable therewith.

5. An abrasive article comprising abrasive grains and a bond containing the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and a copolymer of a major proportion of butadiene and a minor proportion of isoprene.

6. An abrasive article comprising abrasive grains and a bond containing the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and an organic polysulphide polymer plastic of substantially the structural unit

where

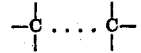

represents two carbon atoms joined to and separated by intervening structure characterized by an ether linkage.

7. A new composition comprising the vulcanization product of a mixture of a copolymer of a major proporton of butadiene and a minor proportion of a compound which contains a

group and is copolymerizable therewith, sulphur in amount to vulcanize said copolymer to a state comparable to hard rubber, and a material selected from the group consisting of polymerized chloro-2-butadiene-1,3, copolymers of a major proportion of isobutylene and a minor proportion of a conjugated diolefine copolymerizable therewith, organic polysulphide polymer plastics which are polymers of substantially the structural unit

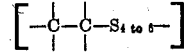

and organic polysulphide polymer plastics which are polymers of substantially the structural unit

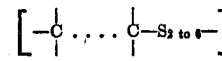

where

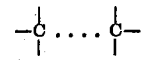

represents two carbon atoms joined to and separated by intervening structure.

8. A new composition comprising the vulcanization product of a mixture of a synthetic rubber copolymer of a major proportion of butadiene and a minor proportion of a compound which contains a

group and is copolymerizable therewith, sulphur in amount to vulcanize said copolymer to a state comparable to hard rubber, and synthetic rubber selected from the group consisting of polymerized chloro-2-butadiene-1,3, copolymers of a major proportion of isobutylene and a minor proportion of a conjugated diolefine copolymerizable therewith, organic polysulphide polymer plastics which are polymers of substantially structural unit

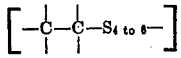

and organic polysulphide polymer plastics which are polymers of substantially the structural unit

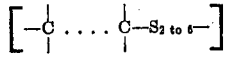

where

represents two carbon atoms joined to and separated by intervening structure, the proportions of the two synthetic rubbers being within the range 1:5 to 5:1 parts by weight.

9. A new composition comprising the vulcanization product of a mixture of a synthetic rubber selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and polymerized chloro-2-butadiene-1,3.

10. A new composition comprising the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and a copolymer of a major proportion of isobutylene and a minor proportion of a conjugated diolefine copolymerizable therewith.

11. A new composition comprising the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and a copolymer of a major proportion of isobutylene and a minor proportion of isoprene.

12. A new composition comprising the vulcanization product of a mixture of a material selected from the group consisting of copolymers of a major proportion of butadiene-1,3 and a minor proportion of styrene and copolymers of a major proportion of butadiene-1,3 and a minor proportion of acrylic nitrile, sulphur in amount to vulcanize said copolymer to a state comparable to hard rubber, and an organic polysulphide polymer plastic of substantially the structural unit

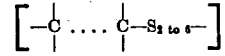

where

represents two carbon atoms joined to and separated by intervening structure characterized by an ether linkage.

CHARLES E. DRAKE.